United States Patent
Gokavarapu et al.

(10) Patent No.: US 11,695,849 B2
(45) Date of Patent: Jul. 4, 2023

(54) TRANSACTION TRACKING FOR HIGH AVAILABILITY ARCHITECTURE USING A TRACKING TOKEN AND MIDDLEWARE INSTANCE INFORMATION

(71) Applicant: International Business Machines Corporation, Armonk, NY (US)

(72) Inventors: Nageswararao Venkata Gokavarapu, Bangalore (IN); Madhu B Ananthapadmanabh, Bangalore (IN); Abel Palaty, Thrissur (IN); Manjunath D, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 17/151,798

(22) Filed: Jan. 19, 2021

(65) Prior Publication Data

US 2022/0232089 A1    Jul. 21, 2022

(51) Int. Cl.
*H04L 67/566* (2022.01)
*H04L 67/14* (2022.01)
(Continued)

(52) U.S. Cl.
CPC ............ *H04L 67/566* (2022.05); *G06F 9/466* (2013.01); *G06F 9/5033* (2013.01); *H04L 67/02* (2013.01);
(Continued)

(58) Field of Classification Search
CPC . H04L 67/2804; H04L 67/2833; H04L 67/02; H04L 67/1014; H04L 67/14;
(Continued)

(56) References Cited

U.S. PATENT DOCUMENTS 8,290,896 B2 * 10/2012 Zhao ................. G06F 16/24552
707/688
8,433,809 B2 * 4/2013 Dor ......................... G06Q 50/14
709/227

(Continued)

OTHER PUBLICATIONS

Vilaghy et al. WebSphere for x/OF Connectivity Architectural Choices, Dec. 2004, [retrieved on Aug. 22, 2022] Retrieved from < URL: >, pp. 1-166 (Year: 2004).*

(Continued)

*Primary Examiner* — Meng Ai T An
*Assistant Examiner* — Hsing Chun Lin
(74) *Attorney, Agent, or Firm* — Cantor Colburn LLP; Edward Wixted

(57) ABSTRACT

Techniques for transaction tracking for a high availability architecture are described herein. An aspect includes receiving a first request from a client, the first request corresponding to a start of a transaction having transaction affinity. Another aspect includes, based on receiving the first request from the client, generating a transaction tracking token. Another aspect includes sending the first request with the transaction tracking token to a gateway. Another aspect includes receiving a first response corresponding to the first request from the gateway, the first response including middleware instance information corresponding to a middleware instance, wherein a plurality of subsequent requests from the client corresponding to the transaction are processed by the middleware instance corresponding to the middleware instance information.

17 Claims, 6 Drawing Sheets

(51) Int. Cl.
*H04L 67/1014* (2022.01)
*G06F 9/50* (2006.01)
*G06F 9/46* (2006.01)
*H04L 67/02* (2022.01)

(52) U.S. Cl.
CPC .......... *H04L 67/1014* (2013.01); *H04L 67/14* (2013.01); *G06F 2201/87* (2013.01)

(58) Field of Classification Search
CPC ..... H04L 67/566; G06F 9/466; G06F 9/5033; G06F 2201/87
See application file for complete search history.

(56) References Cited

U.S. PATENT DOCUMENTS

| | | |
|---|---|---|
| 9,519,509 B2* | 12/2016 | Somogyi ................ H04L 67/34 |
| 10,616,109 B1* | 4/2020 | Liu ........................ H04L 67/327 |
| 2014/0089387 A1* | 3/2014 | Chapman .............. H04L 67/142 |
| | | 709/203 |
| 2014/0236948 A1 | 8/2014 | Somogyi et al. |
| 2018/0260291 A1 | 9/2018 | Misra et al. |
| 2019/0075170 A1 | 3/2019 | Colrain et al. |
| 2019/0097994 A1 | 3/2019 | Mathew et al. |

OTHER PUBLICATIONS

IBM, CICS Application Programming Guide, Apr. 2008, [retrieved on Aug. 22, 2022] Retrieved from <URL:https://ibmdocs.pocnet.net/SC34-6433-05.pdf>, pp. 1-731 (Year: 2008).*

\* cited by examiner

TRANSACTION TRACKING FOR HIGH AVAILABILITY ARCHITECTURE USING A TRACKING TOKEN AND MIDDLEWARE INSTANCE INFORMATION

BACKGROUND

The present invention generally relates to computer systems, and more specifically, to transaction tracking for a high availability architecture.

A high availability architecture can include a group of computers that support server applications that can be reliably utilized with relatively low downtime. Software in a high availability architecture can harness redundant computers in groups or clusters that provide continued service when system components fail. In a highly available architecture, if there is an error (e.g., a server running a particular application crashes), the highly available architecture can detect and hardware and/or software faults associated with the error and restart the application on another system without requiring administrative intervention, a process known as failover. Highly available architectures can be used for many types of services, such as critical databases, file sharing on a network, business applications, and customer services such as electronic commerce websites.

SUMMARY

Embodiments of the present invention are directed to transaction tracking for a high availability architecture. A non-limiting example computer-implemented method includes receiving a first request from a client, the first request corresponding to a start of a transaction having transaction affinity. The method also includes, based on receiving the first request from the client, generating a transaction tracking token. The method also includes sending the first request with the transaction tracking token to a gateway. The method also includes receiving a first response corresponding to the first request from the gateway, the first response including middleware instance information corresponding to a middleware instance, wherein a plurality of subsequent requests from the client corresponding to the transaction are processed by the middleware instance corresponding to the middleware instance information.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
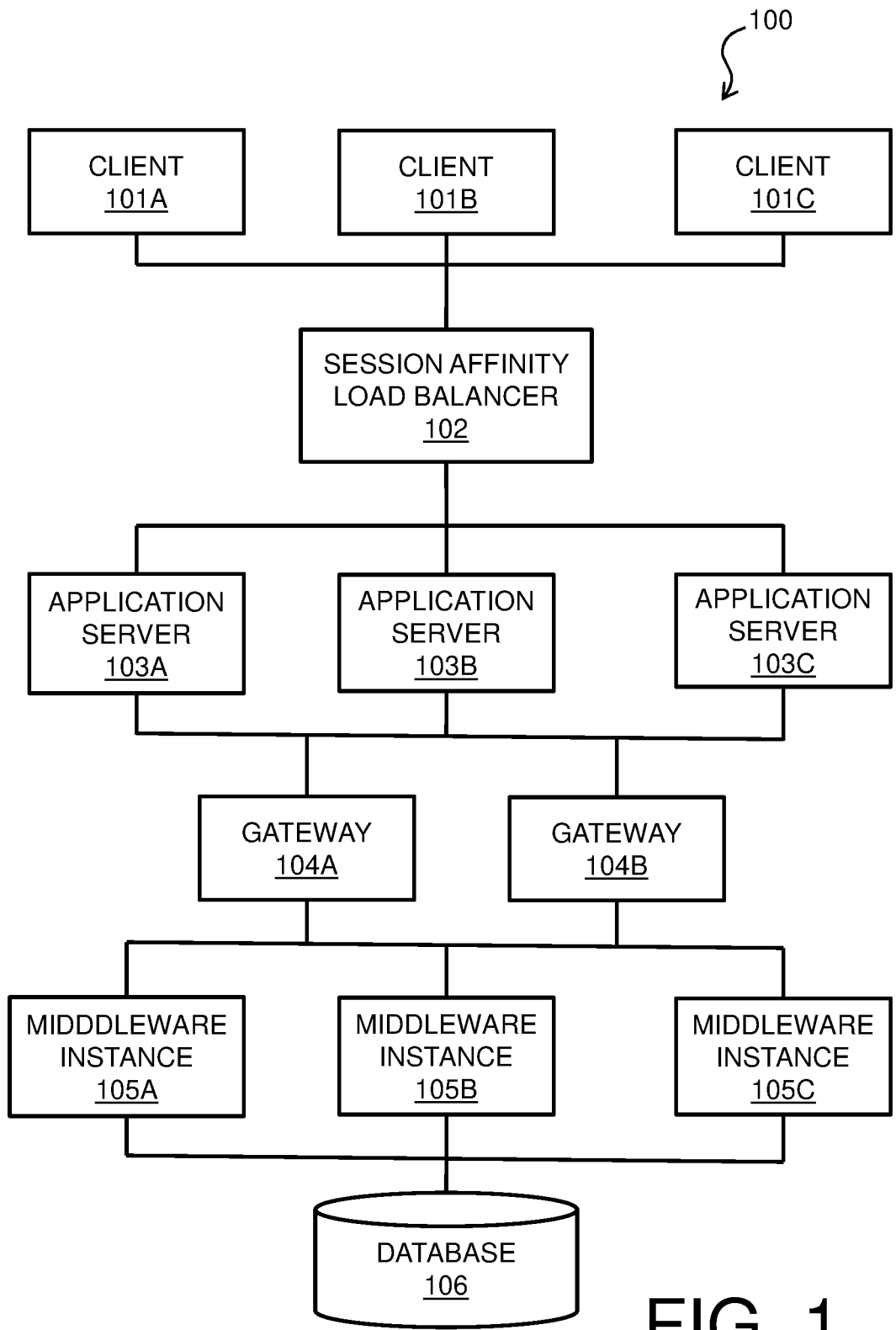
FIG. 1 is a block diagram of components of a system for transaction tracking for a high availability architecture in accordance with one or more embodiments of the present invention.

One or more embodiments of the present invention provide transaction tracking for a high availability architecture. A high availability architecture can be an online transaction processing (OLTP) topology that includes multiple tiers (i.e., an N-tier architecture) for processing of client requests. The tiers in an N-tier architecture can include, but are not limited to, load balancers, application servers, gateways, middleware (e.g., customer information control system, or CICS regions), and one or more databases. Clients can access the data in the database of a highly available architecture via the plurality of tiers. Client requests can be grouped into transactions that each include a set of requests. It may be necessary for the requests corresponding to a particular transaction to be processed by the same middleware instance. Embodiments of the invention include transaction tracking tokens that are implemented in the application servers and gateways of a highly available architecture in order to ensure that requests belonging to the same transaction can be processed by the same middleware instance.

In some embodiments of the invention, custom fields in a transaction tracking token can be used to enforce end-to-end transaction affinity for requests in a high availability architecture. The application server and the gateway can each include a respective transaction tracking module. The application server transaction tracking module can generate a unique transaction tracking token for every transaction instance. A transaction tracking token can contain transaction information fields, such as a transaction correlator (e.g., identifier) and system information fields, that are populated by the application server, and a middleware instance information field that is populated by the gateway transaction tracking module. The gateway transaction tracking module can ensure that any requests belonging to the same transaction are routed to the same middleware instance based on the transaction tracking token information that is associated with each request in order to ensure transaction affinity in the high availability architecture.

A unique transaction correlator can be generated for every transaction that is initiated by the client. When the request reaches the gateway, the gateway can select the appropriate middleware instance in the next tier based on the workload balancer logic. The gateway can append the selected middleware instance information to the transaction tracking token as additional metadata. Because the transaction correlator may not change within a transaction, the metadata, including the previous selected middleware instance information, can be used by the gateway to route any requests associated with a single transaction to the same middleware instance, maintaining end-to-end transaction affinity. In some embodiments of the invention, particular middleware instances can include specific functionalities that may be needed for particular transaction types. Therefore, requests associated with a single transaction can be routed by the gateway to a particular middleware instance having a specific functionality that is required by the single transaction.

Turning now to FIG. 1, a system 100 that includes transaction tracking for a high availability architecture is generally shown in accordance with one or more embodiments of the present invention. System 100 can be implemented in conjunction with any appropriate computer system, including but not limited to computer system 600 of FIG. 6. System 100 includes a number of clients 101A-C that are in communication with a session affinity load balancer 102. The session affinity load balancer 102 passes requests from clients 101A-C to application servers 103A-C. The application servers 103A-C host one or more applications that process requests from clients 101A-C using data from database 106 that is retrieved via gateways 104A-B and middleware instances 105A-C. In some embodiments of the invention, middleware instances 105A-C can each include a CICS region.

In some embodiments of the invention, individual middleware instances of middleware instances 105A-C can be configured to have different functionalities (e.g., may be configured to execute priority workloads or user-specific workloads). Therefore, any requests belonging to a transaction that requires specific middleware functionality can be routed to a same middleware instance of middleware instances 105A-C by the gateways 104A-B based on transaction tracking tokens that are implemented in application servers 103A-C and gateways 104A-B. A transaction tracking token can be generated by an application server of application servers 103A-C based on the start of a transaction that is initiated by a client of clients 101A-C. The transaction tracking token that is generated by an application server such as application server 103A can include a transaction correlator and any other appropriate system information associated with a transaction. The transaction tracking token can also include one or more additional fields that are populated by a gateway of gateways 104A-B with information corresponding to a particular middleware instance of middleware instances 105A-C that is selected for processing the requests associated with the transaction. Implementation of transaction tracking tokens in system 100 of FIG. 1 is discussed in further detail below with respect to FIG. 2.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, clients, load balancers, application servers, gateways, middleware instances, databases, tiers, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
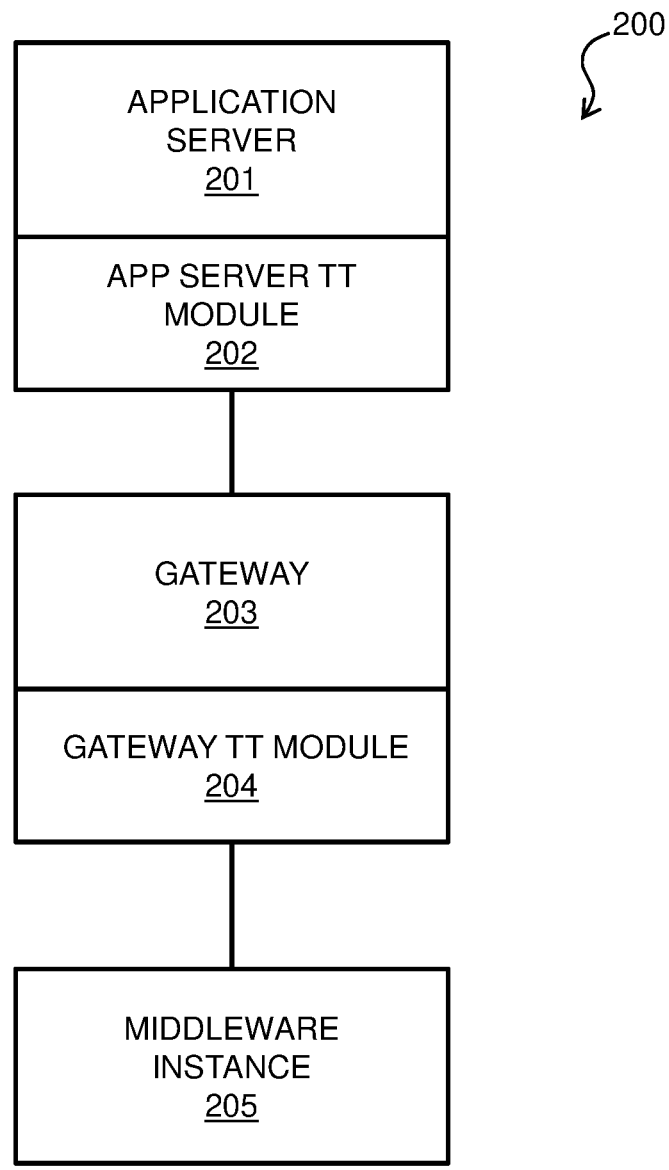
FIG. 2 is a block diagram of components of a system for transaction tracking for a high availability architecture in accordance with one or more embodiments of the present invention.

Turning now to FIG. 2, a system 200 that includes transaction tracking for a high availability architecture is generally shown in accordance with one or more embodiments of the present invention. System 200 can be implemented in conjunction with system 100 of FIG. 1. Application server 201 can correspond to any of application servers 103A-C of system 100 of FIG. 1; gateway 203 can correspond to any of gateways 104A-B of system 100 of FIG. 1; and middleware instance 205 can correspond to any of middleware instances 105A-C of system 100 of FIG. 1. Application server 201 includes an application server transaction tracking module 202; application server transaction tracking module 202 can implement embodiments of method 300 of FIG. 3, which is discussed below. Gateway 203 includes a gateway transaction tracking module 204; gateway transaction tracking module 204 can implement embodiments of method 400 of FIG. 4, which is discussed below. Each of application servers 103A-C that are illustrated in system 100 of FIG. 1 can include a respective application server transaction tracking module 202, and each of gateways 104A-B that are illustrated in system 100 of FIG. 1 can include a respective gateway transaction tracking module 204.

The gateway transaction tracking module 204 in the gateway 203 receives a transaction tracking token from the application server transaction tracking module 202 in application server 201 for every request associated with a transaction instance. The gateway 203 routes the request to a selected middleware instance 205 of the available middleware instances 105A-C. The middleware instance 205 retrieves data corresponding to the request from the database 106 and sends the response including the retrieved data to the gateway 203. The gateway transaction tracking module 204 can append the middleware instance information corresponding to middleware instance 205 to the transaction tracking token and send the response and the transaction tracking token to application server 201. The application server 201 and gateways 203 can use the middleware instance information from the transaction tracking token for subsequent requests that belong to the same transaction. Based on the middleware instance information corresponding to a request, the gateway 203 can send the requests corresponding to a single transaction to a particular middleware instance 205 corresponding to the transaction.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, application servers, gateways, middleware instances, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
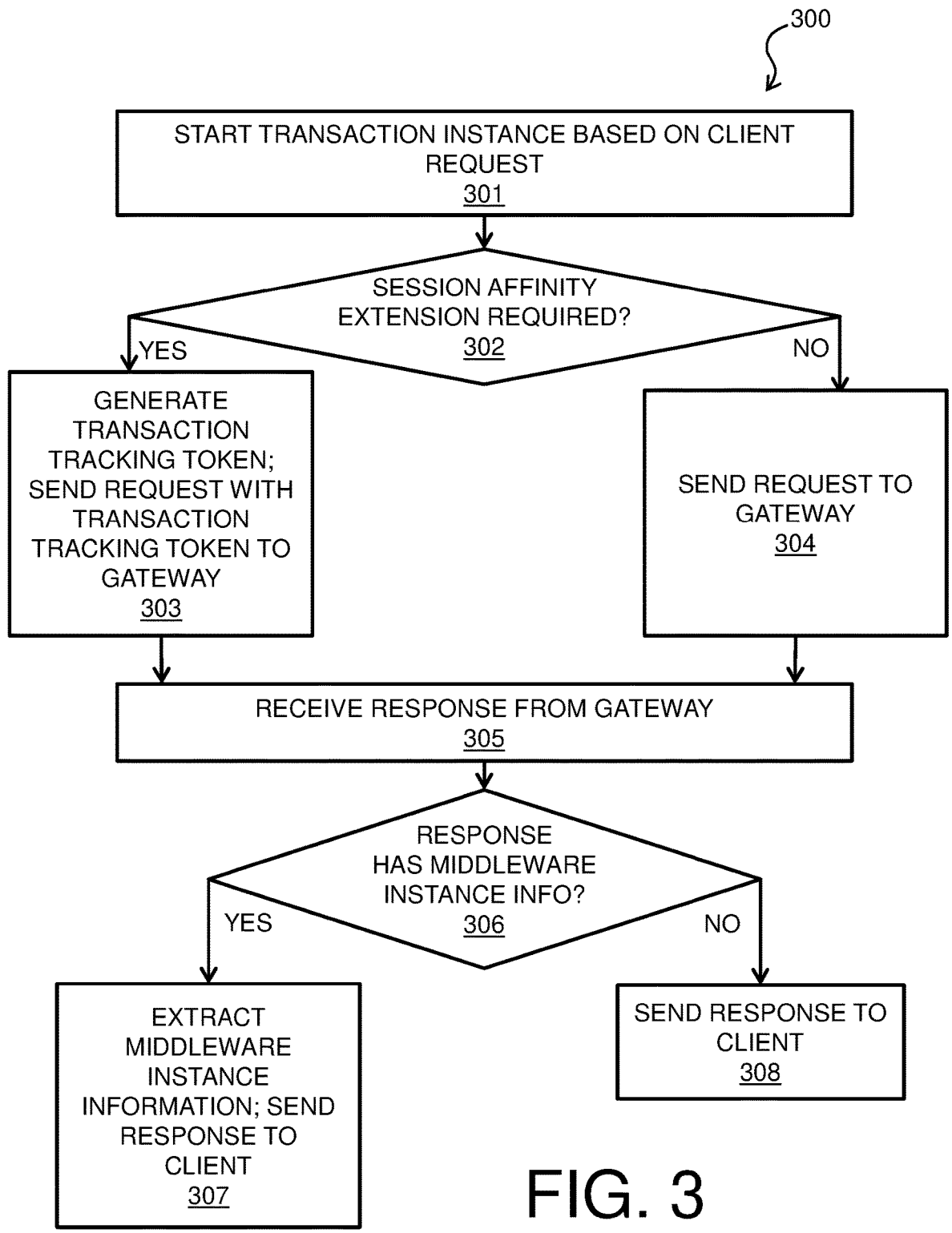
FIG. 3 is a flow diagram of a process for application server transaction tracking for a high availability architecture in accordance with one or more embodiments of the present invention.

FIG. 3 shows a process flow diagram of a method 300 for application server transaction tracking for a high availability architecture in accordance with one or more embodiments of the present invention. Method 300 of FIG. 3 can be implemented in an application server transaction tracking module such as application server transaction tracking module 202 in application server 201 of system 200 of FIG. 2. In block 301 of method 300, the application server transaction tracking module 202 in an application server 103A/201 in system 100 starts a new transaction instance based on a request received from a client 101A in system 100. In block 302, it is determined whether a transaction affinity extension is required for the new transaction; the determination of block 302 can be made based on information contained in the client request. If it is determined in block 302 that a transaction affinity extension is required, flow proceeds to block 303, in which the application server transaction tracking module 202 generates a transaction tracking token corresponding to the transaction associated with the request, and the application server 103A/201 sends the request with the transaction tracking token to a gateway 104A/203 in the system 100. The transaction tracking token that is generated in block 303 can include a transaction correlator and any other appropriate system information, and can include one or more blank fields that are reserved to be populated by the gateway 104A/203. Flow then proceeds from block 303 to block 305. If it is determined in block 302 that a transaction affinity extension is not required, flow proceeds to block 304, and the request is sent from the application server 103A/201 to the gateway 104A/203 without a transaction tracking token. Flow then proceeds from block 304 to block 305.

In block 305, a response corresponding to the request that was forwarded in either block 303 or 304 is received at the application server 103A/201 from the gateway 104A/203. The response that is received in block 305 can include data that was retrieved by a middleware instance of middleware instances 105A-C from database 106, and application server 103A/201 can process the request based on the data in the response from the gateway 104A/201. In block 306, it is determined whether the response from the gateway 104A/201 includes a transaction tracking token including middleware instance information. If it is determined in block 306 that the response includes a transaction tracking token including middleware instance information, flow proceeds from block 306 to block 307. In block 307, the middleware instance information is extracted from the transaction tracking token associated with the response by application server transaction tracking module 202 for use with any subsequent client requests corresponding to the same transaction. The middleware instance information can be stored in application server transaction tracking module 202 with the transaction correlator corresponding to the request, and used for routing subsequent requests corresponding to the same transaction correlator. The application server 103A/201 then sends a response to the client 101A based on the response received from the gateway 104A/201. If it is determined in block 306 that there is no middleware instance information in the response, flow proceeds to block 308, and a response is sent from the application server 103A/201 to the client 101A without any middleware instance information.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
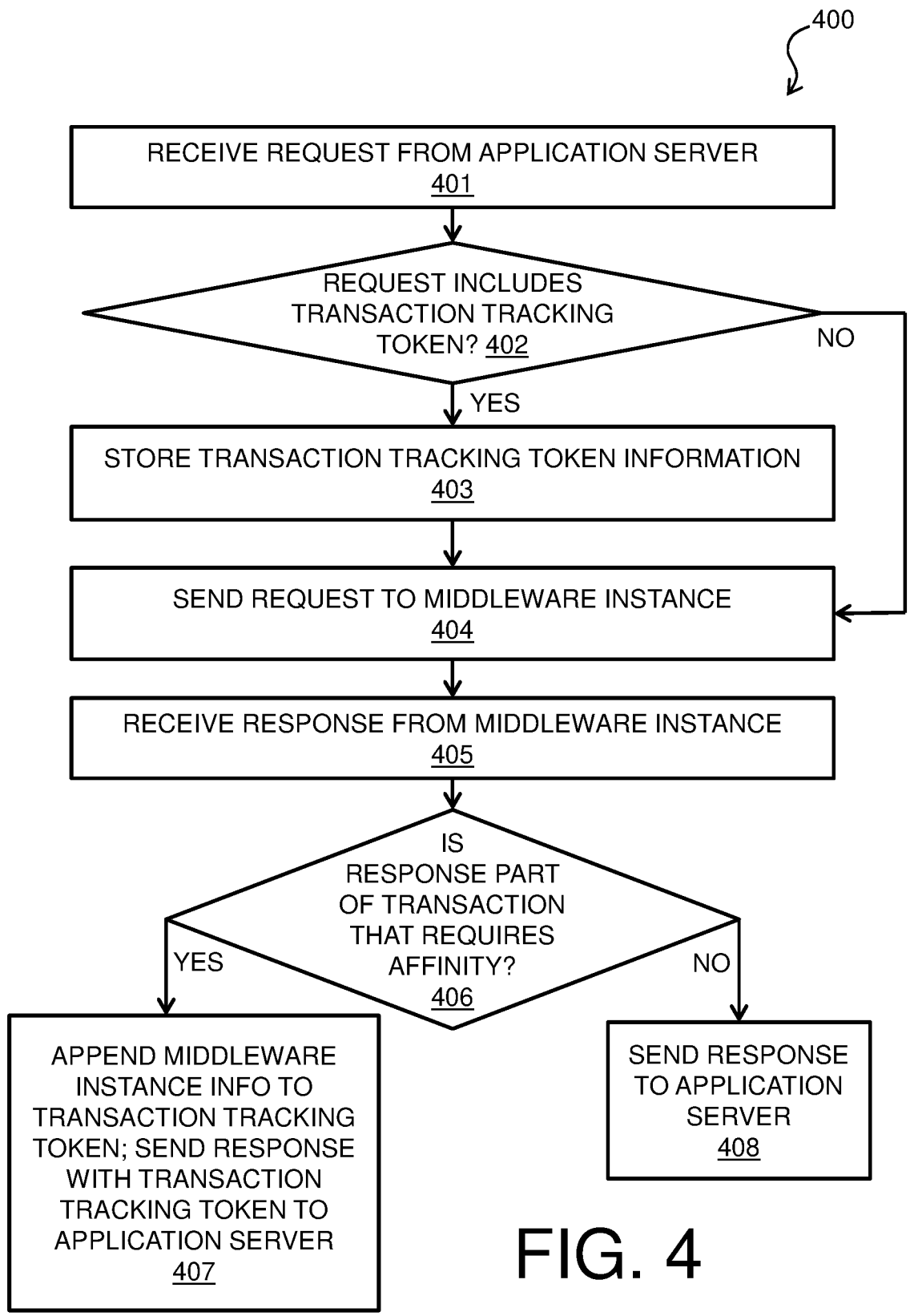
FIG. 4 is a flow diagram of a process for gateway transaction tracking for a high availability architecture in accordance with one or more embodiments of the present invention.

FIG. 4 shows a process flow diagram of a method 400 for gateway transaction tracking for a high availability architecture in accordance with one or more embodiments of the present invention. Method 400 of FIG. 4 can be implemented in a gateway transaction tracking module such as gateway transaction tracking module 204 in gateway 203 of system 200 of FIG. 2. In block 401 of method 400, a client request (e.g., a request that was forwarded in one of blocks 303 and 304 of method 300 of FIG. 3) is received by a gateway 104A/203 in system 100 from an application server 103A/201. In block 402, it is determined whether the request that was received in block 401 includes a transaction tracking token. If it is determined in block 402 that the request includes a transaction tracking token, flow proceeds from block 402 to block 403, and the transaction information from the transaction tracking token is stored in gateway transaction tracking module 204. Flow then proceeds from block 403 to block 404. If it is determined in block 402 that the request does not include a transaction tracking token, flow proceeds from block 402 to block 404.

In block 404, the request is forwarded to a middleware instance 205/105A of middleware instances 105A-C. In some embodiments of block 404, the request can be forwarded to a particular middleware instance 105A that is selected by the gateway 104A/203 based on specific capabilities of the middleware instance that are required by the request (e.g., the selected middleware instance may be configured to execute priority workloads or user-specific workloads). In block 405, a response is received from the middleware instance 105A. The response that is received in block 405 can include data that was retrieved by the middleware instance 105A from database 106 in order to fulfill the request. In block 406, it is determined whether the received response is part of a transaction that requires transaction affinity. The determination of block 406 can be made based on the transaction information that was stored in gateway transaction tracking module 204 in block 403. If it is determined in block 406 that the response is part of a transaction that requires transaction affinity, flow proceeds from block 406 to block 407, in which an identifier of the middleware instance that processed the response is appended to the transaction tracking token, and the response is forwarded to the application server 103A/201 with the transaction tracking token including the middleware instance information (e.g., as described with respect to blocks 305, 306, and 307 of method 300 of FIG. 3). The middleware instance information can be inserted into a blank field in the transaction tracking token by gateway 104A/203 in block 407. If it is determined in block 406 that the response is not part of a transaction that requires transaction affinity, flow proceeds to block 408, and the response is sent to the application server 103A/201 without any middleware instance information (e.g., as described above with respect to blocks 305, 306, and 308 of method 300 of FIG. 3.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
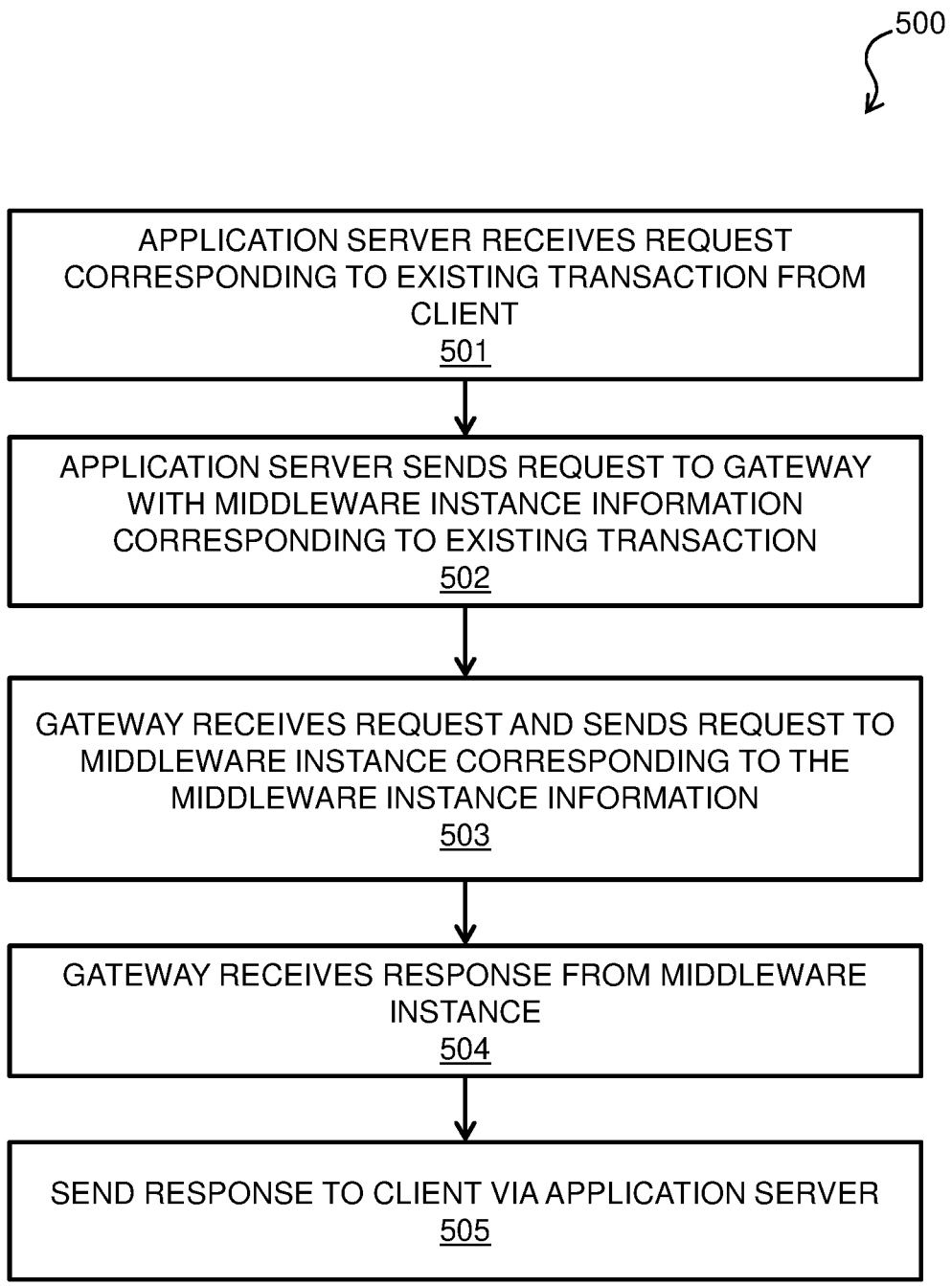
FIG. 5 is a flow diagram of a process for transaction tracking for a high availability architecture in accordance with one or more embodiments of the present invention.

FIG. 5 shows a process flow diagram of a method 500 for transaction tracking for a high availability architecture in accordance with one or more embodiments of the present invention. Method 500 of FIG. 5 can be implemented in conjunction with embodiments of system 100 of FIG. 1, and system 200 of FIG. 2 based on transaction tracking tokens as are discussed above with respect to method 300 of FIG. 3 and method 400 of FIG. 4. In block 501, application server 103A/201 receives a request from client 101A that is part of an existing transaction. The request can include a transaction correlator corresponding to the existing transaction in some embodiments of the invention. In block 502, the application server 103A/201 sends the request to gateway 104A/203 with a transaction tracking token including middleware instance information corresponding to the existing transaction that was stored in application server transaction tracking module 202. In block 503, the gateway 104A/203 receives the request, and sends the request to the middleware instance 105A/205 corresponding to the middleware instance information in the transaction tracking token, which is processed by gateway transaction tracking module 204. In block 504, the gateway 104A/203 receives a response from the middleware instance 105A/205. The response can include information that was retrieved from database 106 corresponding to the request. In block 505, the response is forwarded to the application server 103A/201, and the application server 103A/201 processes the request based on the data in the response, and provides a response to the client 101A. Method 500 can be repeated for any number of requests from client 101A corresponding to the existing transaction; any requests corresponding to the existing transaction can be routed to a same application server 103A/201 by session affinity load balancer 102 in some embodiments of the invention.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
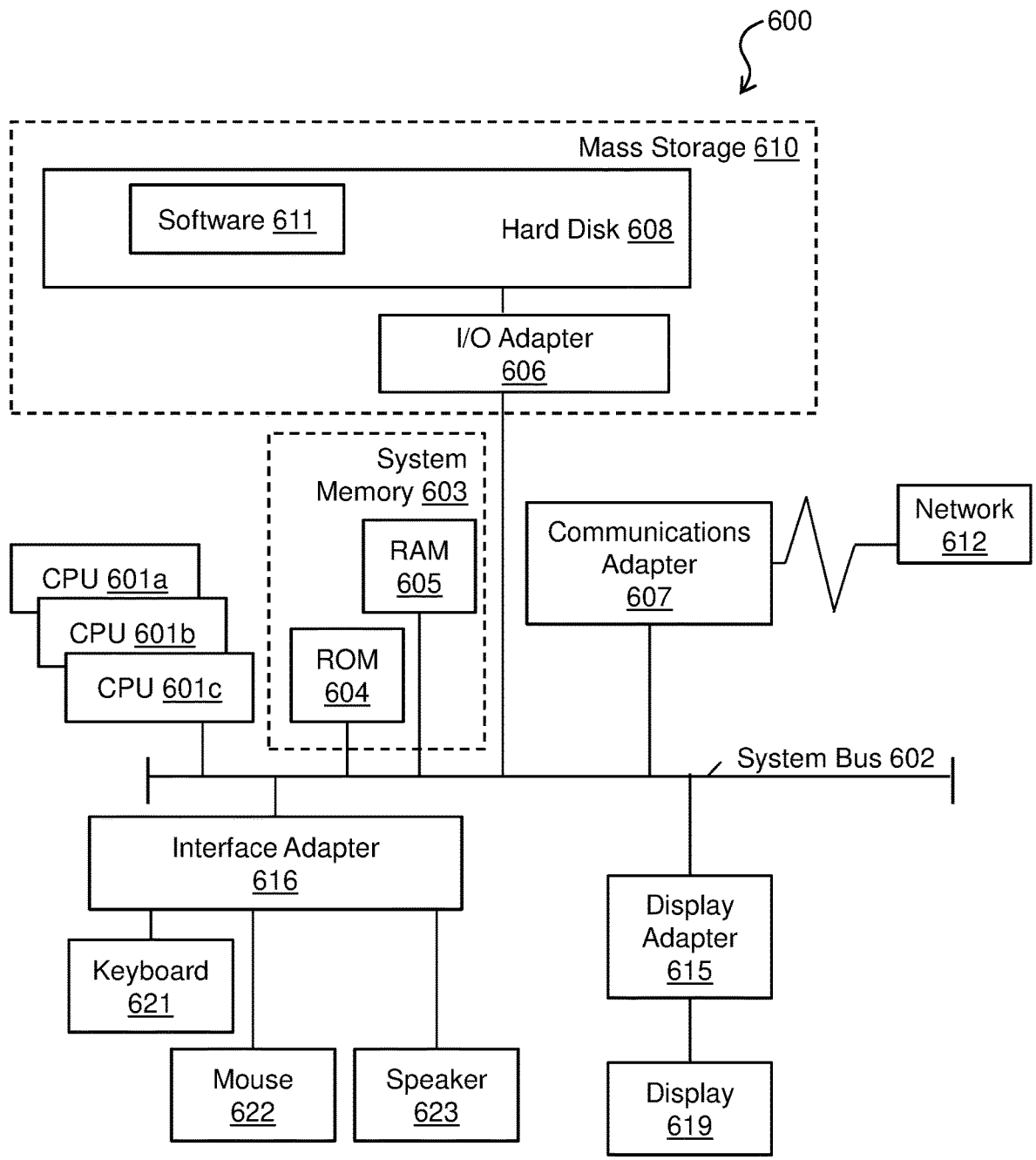
FIG. 6 is a block diagram of an example computer system for use in conjunction with one or more embodiments of transaction tracking for a high availability architecture.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for providing transaction affinity for transactions comprised of multiple requests, the method comprising:
   receiving, at an application server executing on a processor, a first request from a client, the first request corresponding to a start of a transaction comprising multiple requests;

based on receiving the first request from the client:
  generating, at the application server, a transaction tracking token;
  processing, at the application server, the first request, the processing the first request comprising sending the first request with the transaction tracking token to a gateway; and
  receiving, at the application server, a first response corresponding to the first request from the gateway, the first response comprising middleware instance information corresponding to a middleware instance selected by the gateway for the transaction in response to receiving the first request, the middleware instance selected by the gateway from a plurality of middleware instances based at least in part on a functionality of the middleware instance required by the transaction;
subsequent to receiving the first request, receiving, at the application server executing on the processor, a second request from the client, the second request corresponding to the transaction; and
processing, by the application server, the second request based at least in part on the previously generated transaction token and on the middleware instance information corresponding to the previously selected middleware instance, the processing the second request comprising sending the second request to the gateway with the middleware instance information.

2. The method of claim 1, wherein the first response from the gateway further comprises information that was retrieved by the middleware instance and sent to the gateway, the information from a database coupled to the middleware instance.

3. The method of claim 1, wherein the generated transaction tracking token comprises a transaction correlator identifying the transaction and a blank field.

4. The method of claim 3, wherein the middleware instance information is inserted into the blank field in the transaction tracking token by the gateway.

5. The method of claim 3, further comprising storing the transaction correlator and the middleware instance information in an application server transaction tracking module located on the application server.

6. The method of claim 1, wherein the application server is in a highly available online transaction processing (OLTP) architecture.

7. A system for providing transaction affinity for transactions comprised of multiple requests, the system comprising:
  a memory having computer readable instructions; and
  one or more processors for executing the computer readable instructions, the computer readable instructions controlling the one or more processors to perform operations comprising:
    receiving, at an application server, a first request from a client, the first request corresponding to a start of a transaction comprising multiple requests; based on receiving the first request from the client:
      generating, at the application server, a transaction tracking token;
      processing, at the application server, the first request, the processing the first request comprising sending the first request with the transaction tracking token to a gateway; and
      receiving, at the application server, a first response corresponding to the first request from the gateway, the first response comprising middleware instance information corresponding to a middleware instance selected by the gateway for the transaction in response to receiving the first request, the middleware instance selected by the gateway from a plurality of middleware instances based at least in part on a functionality of the middleware instance required by the transaction;
    subsequent to receiving the first request, receiving, at the application server, a second request from the client, the second request corresponding to the transaction; and
    processing, by the application server, the second request based at least in part on the previously generated transaction token and on the middleware instance information corresponding to the previously selected middleware instance, the processing the second request comprising sending the second request to the gateway with the middleware instance information.

8. The system of claim 7, wherein the first response from the gateway further comprises information that was retrieved by the middleware instance and sent to the gateway, the information from a database coupled to the middleware instance.

9. The system of claim 7, wherein the generated transaction tracking token comprises a transaction correlator identifying the transaction and a blank field.

10. The system of claim 9, wherein the middleware instance information is inserted into the blank field in the transaction tracking token by the gateway.

11. The system of claim 9, the operations further comprising storing the transaction correlator and the middleware instance information in an application server transaction tracking module located on the application server.

12. The system of claim 7, wherein the application server is in a highly available online transaction processing (OLTP) architecture.

13. A non-transitory computer program product for providing transaction affinity for transactions comprised of multiple requests, the computer program product comprising a computer readable storage medium having program instructions embodied therewith, the program instructions executable by one or more processors to cause the one or more processors to perform operations comprising:
  receiving, at an application server, a first request from a client, the first request corresponding to a start of a transaction comprising multiple requests; based on receiving the first request from the client:
    generating, at the application server, a transaction tracking token;
    processing, at the application server, the first request, the processing the first request comprising sending the first request with the transaction tracking token to a gateway; and
    receiving, at the application server, a first response corresponding to the first request from the gateway, the first response comprising middleware instance information corresponding to a middleware instance selected by the gateway for the transaction in response to receiving the first request, the middleware instance selected by the gateway from a plurality of middleware instances based at least in part on a functionality of the middleware instance required by the transaction;
  subsequent to receiving the first request, receiving, at the application server, a second request from the client, the second request corresponding to the transaction; and processing, by the application server, the second request based at least in part on the previously generated transaction token and on the middleware instance information corresponding to the previously selected middleware instance, the processing the second request comprising sending the second request to the gateway with the middleware instance information.

14. The computer program product of claim 13, wherein the first response from the gateway further comprises information that was retrieved by the middleware instance and sent to the gateway, the information from a database coupled to the middleware instance.

15. The computer program product of claim 13, wherein the generated transaction tracking token comprises a transaction correlator identifying the transaction and a blank field.

16. The computer program product of claim 15, wherein the middleware instance information is inserted into the blank field in the transaction tracking token by the gateway.

17. The computer program product of claim 15, the operations further comprising storing the translation correlator and the middleware instance information in an application server transaction tracking module located on the application server.

* * * * *